United States Patent [11] 3,609,011

| [72] | Inventor | Keiichi Sakaguchi<br>Yokohama-shi, Japan |
| --- | --- | --- |
| [21] | Appl. No. | 850,131 |
| [22] | Filed | Aug. 14, 1969 |
| [45] | Patented | Sept. 28, 1971 |
| [73] | Assignee | Canon Kabushiki Kaisha<br>Tokyo, Japan |
| [32] | Priority | Aug. 20, 1968 |
| [33] | | Japan |
| [31] | | 43/71,669 |

[54] ZOOM RING FOR ZOOM LENS
2 Claims, 1 Drawing Fig.

[52] U.S. Cl. ........................................................ 350/187, 350/255
[51] Int. Cl. .............................................................. G02b 7/10
[50] Field of Search............................................350/184–187, 44, 58, 255, 74–77; 29/456; 74/89, 99

[56] References Cited
UNITED STATES PATENTS

| 3,437,404 | 4/1969 | Seedhouse.................. | 350/187 UX |
| --- | --- | --- | --- |
| 3,506,338 | 4/1970 | Holderbaum................. | 350/187 |
| 2,377,821 | 6/1945 | Sperry et al.................. | 350/44 X |
| 2,944,431 | 7/1960 | Dexter........................... | 74/89 |

FOREIGN PATENTS

| 14,519 | 6/1902 | Great Britain................. | 350/79 |
| --- | --- | --- | --- |

Primary Examiner—John K. Corbin
Attorney—Anton J. Wille

ABSTRACT: A zoom ring is provided for a zoom lens, the ring being made of at least two members; a cylindrical member including a rotational limit stop and provided with cam slots, and a curved member or plate formed with matching cam slots. The cam slots in both members register with each other when the curved plate is positioned on the cylindrical member by means of pin connections, the cam slots in the cylindrical member being relieved while the plate cam slots are accurately machined.

In zoom lens systems, the zoom lens or lenses are shifted longitudinally with respect to the optical axis of the objective by means of a cam ring having formed therein, cam grooves which may be either curved or straight grooves.

The cam grooves are machined individually to close tolerances to provide accurate focusing, particularly when two lens elements of the objective are separately movable. The zooming cam ring is further provided with a stop member, either in the form of a pin or projection and which may be integrally formed with the ring, to prevent rotation of the ring beyond a predetermined angle and to provide a positive limit for the focusing plane of the objective. Such rings in the past have been manufactured on an individual basis due to the close tolerances required in forming the cam grooves and in setting the stop member. In addition, the wearing down or breaking of the cutting tools led to further complications in providing an accurately machined cam ring suitable for optical work.

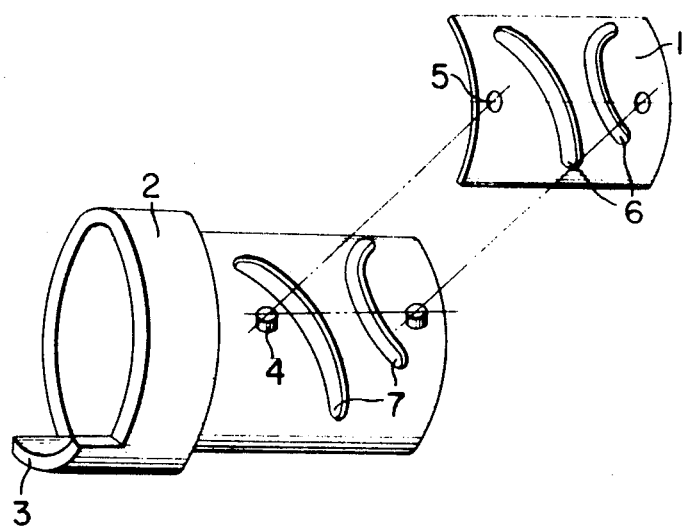

ZOOM RING FOR ZOOM LENS

The cam grooves are machined individually to close tolerances to provide accurate focusing particularly when two lens elements of the objective are separately movable. The zooming cam ring is further provided with a stop member, either in the form of a pin or projection and which may be integrally formed with the ring, to prevent rotation of the ring beyond a predetermined angle and to provide a positive limit for the focusing plane of the objective. Such rings in the past have been manufactured on an individual basis due to the close tolerances required in forming the cam grooves in setting the stop member. In addition, the wearing down or breaking of the cutting tools led to further complications in providing an accurately machined cam ring suitable for optical work.

The object of the present invention is to provide a cam ring for zoom lens system wherein the cam ring is made in at least two places which are then assembled to provide an objective wherein the focusing plane is stabilized and the zooming operation performed with great accuracy, the cam ring being adaptable to mass production methods.

This invention relates to a barrel for holding a zoom lens and more particularly to a zoom ring.

The present invention will be more apparent from the following description referring to the illustrative embodiment shown in the attached drawing, in which a structure of the zoom ring of this invention is perspectively shown.

In accordance with the present invention, the zoom lens barrel of a zooming lens system is preferable made of two members, the one member being cylindrical and carrying the lens elements while the other member is in the form of a thin curved plate which is securable to the cylindrical member. Both members are formed with registering grooves, the grooves in the curved plate however being accurately machined to very close tolerances while the grooves in the cylindrical member are slightly relieved to permit the free passage of cam pins therethrough to register in the curved plate grooves. Integral with, or secured to, the cylindrical member of the ring is a stop member for limiting the rotation of the lens barrel assembly.

Referring now to the drawing in which an embodiment of the present invention is illustrated, the zoom lens barrel comprises a thin curved plate 1 and a cylindrical member 2, the cylindrical member being made by precision casting or plastic moulding. As herein illustrated, the cylindrical member 2, is formed with an integral stop member 3 for limiting the rotation of the member in the usual manner. It will be understood that the stop member may be made separately and then secured to the cylindrical member. Secured to, or made integral with, the cylindrical member 2 are two positioning pins 4 which are adapted to be received within openings 5 provided in the curved plate 1 when assembling the two members. The curved plate 1 is also formed with cam grooves 6 which register with similarly shaped grooves 7 formed in the cylindrical member when the members are assembled. It will be understood that the aligned grooves 6 and 7 receive the pins secured to the variator and compensator lens elements (not shown) of the zoom lens system.

The cam grooves 6 may either be straight line grooves or curved grooves depending upon the movement requirements of the variator and compensator components of the objective. The cam grooves 6 and openings 5 of curved plate 1 are all simultaneously made by a precise press operation and held to very close tolerances. The grooves 7 of the cylindrical member 2 are not precisely made, being in essence relief grooves through which a lens pin (not shown) may pass with some clearance to engage the cam grooves 6 of the curved plate.

The zoom lens barrel provided by the present invention has several distinct advantages over lens barrels found in the prior art. A lens barrel embodying the present invention may be uniformly and accurately made by mass production methods such as press operations, casting and molding methods. Various types of lens barrels may be readily made by providing different curved plates for mounting on the cylindrical member. Further, any repair of replacement of either of the two members can be very readily made.

What is claimed is:

1. A lens barrel for a zoom lens system, comprising in combination
   a cylindrical member,
   a stop member on said cylindrical member for limiting the angle of rotation of the cylindrical member,
   a thin pressed curved plate formed with positioning openings,
   positioning pins secured in the peripheral outer surface of said cylindrical member, the positioning openings in said curved plate receiving said positioning pins when said pressed curved plate is assembled on said cylindrical member,
   relieved grooves provided in said cylindrical member,
   cam grooves accurately made to close tolerances in said curved plate registering with said relief grooves to permit the passage of cam pins of lens components of the zoom lens system therethrough.

2. A lens barrel according to claim 1, wherein said stop member is separably securable to said cylindrical member.